US 6,707,232 B2

(12) United States Patent
Iino et al.

(10) Patent No.: US 6,707,232 B2
(45) Date of Patent: Mar. 16, 2004

(54) PIEZOELECTRIC DRIVING BODY, ULTRASONIC MOTOR AND ELECTRONIC APPARATUS HAVING AN ULTRASONIC MOTOR

(75) Inventors: Akihiro Iino, Chiba (JP); Masao Kasuga, Chiba (JP); Makoto Suzuki, Chiba (JP); Tatsuru Sato, Chiba (JP); Satoshi Watanabe, Chiba (JP); Yoko Shinohara, Chiba (JP)

(73) Assignee: Seiko Instruments Inc., Chiba (JP)

( * ) Notice: Subject to any disclaimer, the term of this patent is extended or adjusted under 35 U.S.C. 154(b) by 58 days.

(21) Appl. No.: 09/772,628

(22) Filed: Jan. 30, 2001

(65) Prior Publication Data
US 2001/0011858 A1 Aug. 9, 2001

(30) Foreign Application Priority Data
Jan. 31, 2000 (JP) ........................... 2000-022873

(51) Int. Cl.⁷ ............................................. H01L 41/08
(52) U.S. Cl. ................... 310/323.02; 310/358
(58) Field of Search ............................................ 290/40

(56) References Cited

U.S. PATENT DOCUMENTS

| 4,678,956 A | * | 7/1987 | Izukawa et al. | 310/323.06 |
| 4,959,579 A | * | 9/1990 | Kuwabara et al. | 310/323.09 |
| 5,091,670 A | * | 2/1992 | Kawata et al. | 310/323.09 |
| 5,343,108 A | * | 8/1994 | Miyazawa et al. | 310/323.03 |
| 5,477,100 A | * | 12/1995 | Kataoka | 310/323.06 |
| 5,672,930 A | * | 9/1997 | Narisawa et al. | 310/323.03 |
| 5,783,899 A | * | 7/1998 | Okazaki | 310/317 |
| 5,917,268 A | * | 6/1999 | Takagi | 310/317 |
| 6,064,140 A | * | 5/2000 | Zumeris | 310/323.02 |
| 6,175,181 B1 | * | 1/2001 | Shirasaki | 310/323.04 |
| 6,742,846 | * | 6/2001 | Ashizawa et al. | 310/323.02 |

FOREIGN PATENT DOCUMENTS

| JP | 0055585 | * | 2/1990 | 310/323.02 |
| JP | 0202382 | * | 8/1990 | 310/323.02 |
| JP | 8-253820 | * | 10/1994 | 310/323.02 |
| JP | 8-126359 | * | 5/1996 | |

OTHER PUBLICATIONS

Piezoelectric Linear Motors for Application to Driving a Light Pick–Up Element, Tomikawa et al. pp 393–398. (Copy in 310/323.02).*

* cited by examiner

Primary Examiner—Mark Budd
(74) Attorney, Agent, or Firm—Adams & Wilks

(57) ABSTRACT

An ultrasonic motor has a vibrating body and a piezoelectric element disposed on the vibrating body for generating a vibration wave to vibrate the vibrating body. The vibration wave has a vibration node disposed on a diagonal line of the vibrating body. At least one protrusion is connected to the vibrating body for vibration therewith. The protrusion is disposed on the vibrating body at a position which does not correspond to the position of the vibration node. A moving body is disposed in contact with and driven by the protrusion during vibration thereof.

33 Claims, 9 Drawing Sheets

FIG. 13
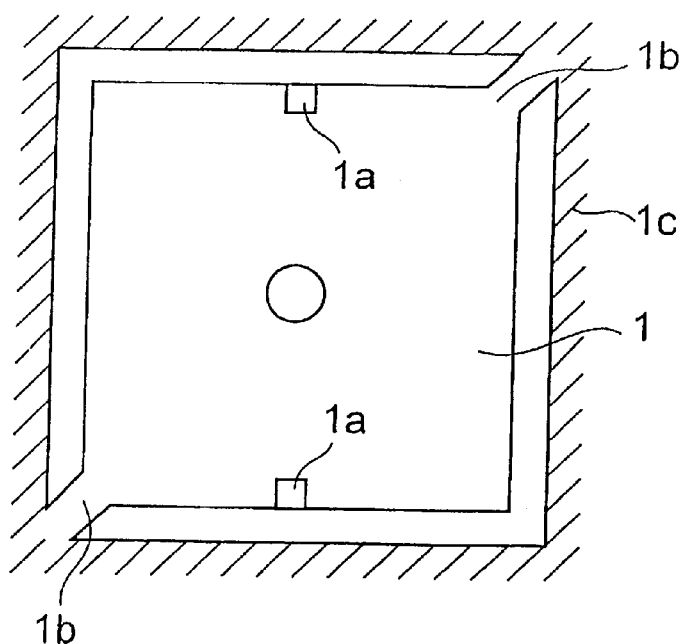
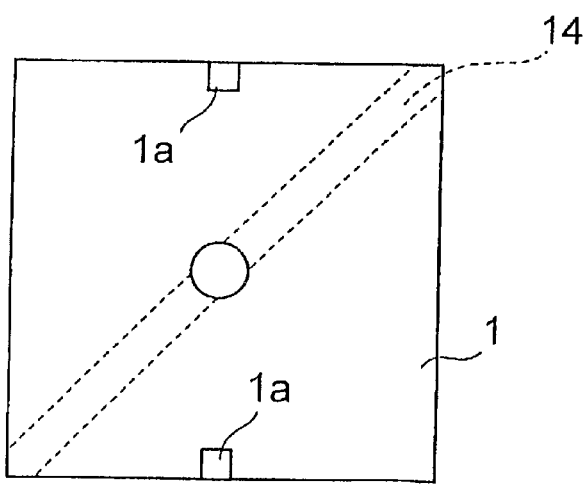
FIG. 14A
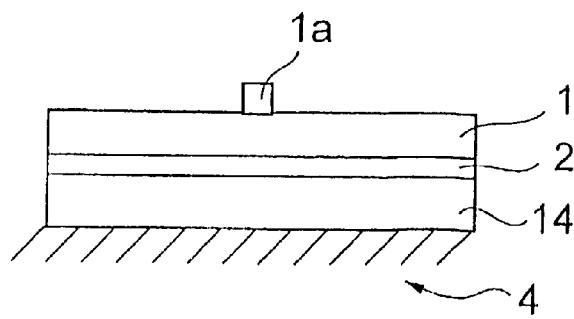
FIG. 14B

PIEZOELECTRIC DRIVING BODY, ULTRASONIC MOTOR AND ELECTRONIC APPARATUS HAVING AN ULTRASONIC MOTOR

BACKGROUND OF THE INVENTION

1. Field of the Invention

The present invention relates to a piezoelectric driving body and an ultrasonic motor having a piezoelectric element as a driving source, and to an electronic apparatus such as an electronic timepiece, a medical equipment, an optical information apparatus, a camera and the like.

2. Description of the Related Art

Various ultrasonic motors have been proposed which employ circular or annular vibrating bodies oscillated in a circumferential direction of the vibrating body to thereby drive a moving body. Such an example is shown in Japanese Patent Publication No. 7750/1994.

Meanwhile, it is known as a manufacturing method of a vibrating body to manufacture through cutting generally from a vibrating body shape by an automatic lathe or the like.

On the other hand, recently there is a proposal on an ultrasonic motor utilizing a micro-machining technology such as etching. Such an example is disclosed, for example, in Japanese Patent Laid-open No. 337052/1998.

However, because the conventional ultrasonic motors as disclosed in Japanese Patent Publication No. 7750/1994 utilize deflection-vibration in a circumferential direction of the vibrating body, the vibrating body must have been increased in plate thickness in order to obtain displacement in a feed direction of the moving body, i.e. displacement in a circumferential direction, thus incurring increase in resonant frequency. Particularly, the resonant frequency has been increased with increase in the number of waves in the circumferential direction and the number of nodes with respect to a radial direction. Furthermore, because of having protrusions for magnifying displacement, the thickness of the ultrasonic motor has been increased. Also, the increase of manufacture cost has been incurred due to forming one by one vibrating bodies by machining.

Meanwhile, in the structure shown in Japanese Patent Laid-open No. 337052/1998, a large output cannot be obtained because the piezoelectric element is small in area. Further, because the structure has a plurality of cantilevers, the resonant frequency deviates between the cantilevers thus having a problem with deviation in individual motor characteristics. Furthermore, there is the disadvantage that the direction of rotation is in only one direction.

In view of the above problems, the present invention realizes an ultrasonic motor capable of suppressing an increase in resonant frequency and obtaining a great amplitude even if made smaller, and it is an object to provide an excellent-quality ultrasonic motor that is simple to manufacture and mass produce, and to provide an electronic apparatus having the ultrasonic motor.

SUMMARY OF THE INVENTION

In order to achieve the above object, an ultrasonic motor of the present invention is characterized, in an ultrasonic motor having a vibrating body in a quadrilateral plate form, a piezoelectric element bonded on the vibrating body, a protrusion provided on the vibrating body, and a moving body in contact with the protrusion to be driven by same, in that the piezoelectric element oscillates a vibration wave having a node on a diagonal line of the vibrating body or on lines with which the vibrating body is divided into two and four, and the protrusion being provided in a position off the node. With this structure and principle, it is possible to obtain a vibration component required for driving the moving body regardless of the plate thickness of the vibrating body and reducing the thickness of the vibrating body and further the ultrasonic motor overall. Also, because the resonant frequency of the vibrating body can be decreased, a great amplitude can be obtained even if made smaller thus realizing an efficient ultrasonic motor.

By providing a plurality of electrodes on the piezoelectric element disposed on the vibrating body and either selecting an electrode to which a drive signal is applied or changing the phase of a drive signal, the node of vibration to be oscillated by the vibrating body can be moved to vary a direction of rotation of the moving body.

According to this invention, because the vibrating body is quadrilateral in shape, a multiplicity of vibrating bodies can be formed at one time by dicing or the like. Even if blanking is made using a press or the like, material can be effectively utilized without leaving the remainder.

Also, in the piezoelectric driving body for including an ultrasonic motor of the invention, the polarizing directions of the piezoelectric element having a plurality of electrode portions are all made in the same direction. Due to this, for example, it is possible to suppress or make even deformation caused where polarization is made after the piezoelectric element is bonded to the vibrating body. The contact situation with the moving body contacting the vibrating body becomes favorable. By polarizing the entire piezoelectric element in the same direction at one time, polarization is favorably provided without impeding required deformation of the piezoelectric element during polarization, and thus making it possible to obtain a large drive force from the piezoelectric vibrating body.

Also, by providing an ultrasonic motor or piezoelectric driving body of the invention on an electronic apparatus, it is possible to realize the reduction of size, thickness and consumption power for the electronic apparatus.

BRIEF DESCRIPTION OF THE DRAWINGS

FIG. 13 is a figure showing a second example of a support method of an ultrasonic motor of the invention;

FIG. 14 is a figure showing a third example of a support method of an ultrasonic motor of the invention;

DETAILED DESCRIPTION OF THE PREFERRED EMBODIMENTS

Hereunder, the present invention will be explained in detail based on the drawings.

<Embodiment 1>

Figure 1:
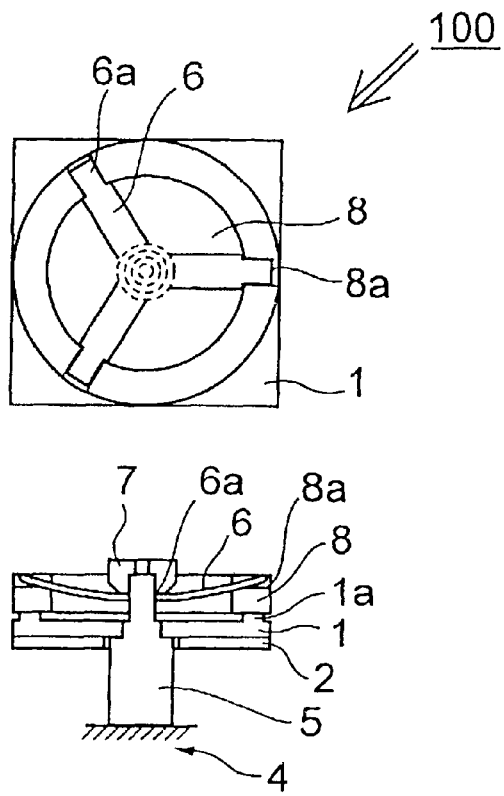
FIG. 1 is a sectional view showing a structure of an ultrasonic motor of this invention.

FIG. 1 shows a plan view and side view of an ultrasonic motor 100 of the present invention.

Figure 2:
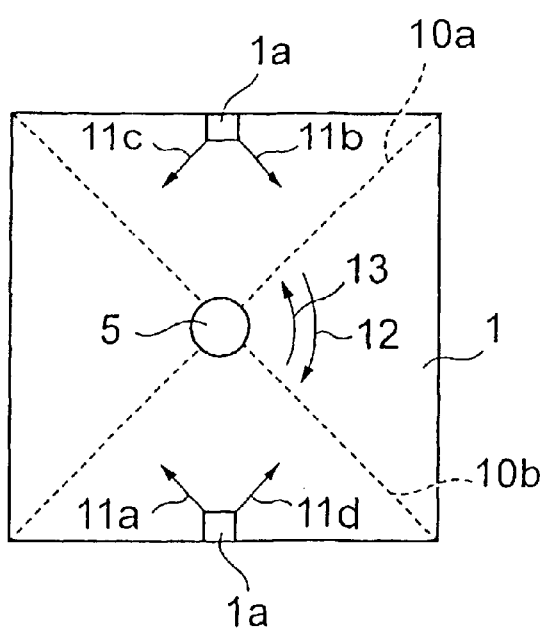
FIG. 2 is a figure explaining the principle of the ultrasonic motor in Embodiment 1.

FIG. 2 is a top view of the ultrasonic motor 100 removed of a moving body 8.

In FIG. 1, a square vibrating body 1 is joined with a piezoelectric element 2. The vibrating body 1 at its center is fixed, for example by driving-in, by a center shaft 5 fixed to a support plate 4. In grooves 8a of the moving body 8, steps 6a of a pressure-applying body 6 are engaged to restrict the moving body 8 from moving in a surface inward direction. The pressure-applying body 6 at a center hole 6a is guided by the center shaft 5 and rotates together with the moving body 8. In the hole 6a may be provided a material high in wear resistance and having a low frictional coefficient, e.g. an engineering-plastic-made bush, an oil-immersion bearing, a ceramics bearing or the like. It may be also provided with a ball bearing.

Also, the pressure-applying body 6 at the center is deflected by a fixing body 7 fixed on the center shaft 5, to provide a contact pressure between the moving body 8 and protrusions 1a provided on the vibrating body 1.

Hereunder, the principle of driving of the ultrasonic motor 100 in the present invention will be explained. In FIG. 2, protrusions 1a of two in number are provided on the vibrating body 1 in point-symmetric positions about the center shaft 5. Herein, the protrusions 1a are each provided along a side of the vibrating body 1 at a center point thereof. The vibrating body 1 is bonded with a piezoelectric body 2 by which a standing wave is oscillated with a node on one diagonal line 10a. At this time, the protrusion 1a at a tip rising in a center-shaft direction also displaces in a direction of the arrow 11a, 11b (in a direction perpendicular to the diagonal line 10a). Consequently, the moving body 8 rotates in a direction of the arrow 12.

On the other hand, if oscillating a standing wave with a node on the other diagonal line 10b, the protrusion 1a at the tip displaces in a direction of the arrow 11c, 11d and accordingly the moving body 8 rotates in a direction of the arrow 13.

By thus having the two protrusions 1a and providing a first protrusion and a second protrusion in symmetric positions with reference to a center of the vibrating body, an output characteristic of the ultrasonic motor 100 becomes constant regardless of rotational direction of the moving body 3. The protrusions 1a, on principle, may be provided anywhere provided that they are in positions off the four corners, and the protrusions 1a may be one in number.

Next, explanation is made on an electrode structure of the piezoelectric element 2 for oscillating a vibration wave having a node on the diagonal line of the vibrating body 1.

Figure 3:
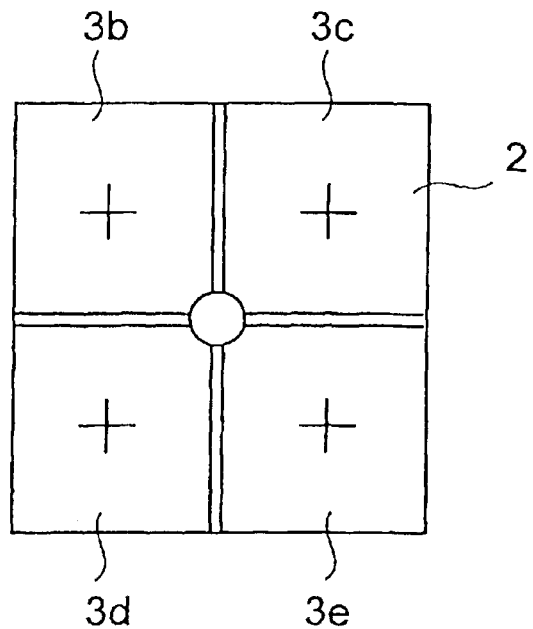
FIG. 3 is a figure of a piezoelectric element in Embodiment 1.

In FIG. 3, the piezoelectric element 2 has, on one surface, four electrodes 3b, 3c, 3d, 3e in areas separated or divided in a grating form by connecting between center points of the mutually-parallel sides of the vibrating body 1. Although not shown, the piezoelectric element 2 has an electrode 3a extending over the entire of the other surface thereof, and in the entire portion is polarization-treated in the same direction as a thickness direction. In the figure, + refers to a polarization direction. Herein, a drive electrode is applied between electrode 3a and the electrode 3b, 3e, a standing wave is caused having a node on the diagonal line 10b of FIG. 2. Next, if a drive signal is applied between the electrode 3a and the electrode 3c, 3d, a standing wave is caused having a node on a diagonal line 10a of FIG. 2.

Figure 4:
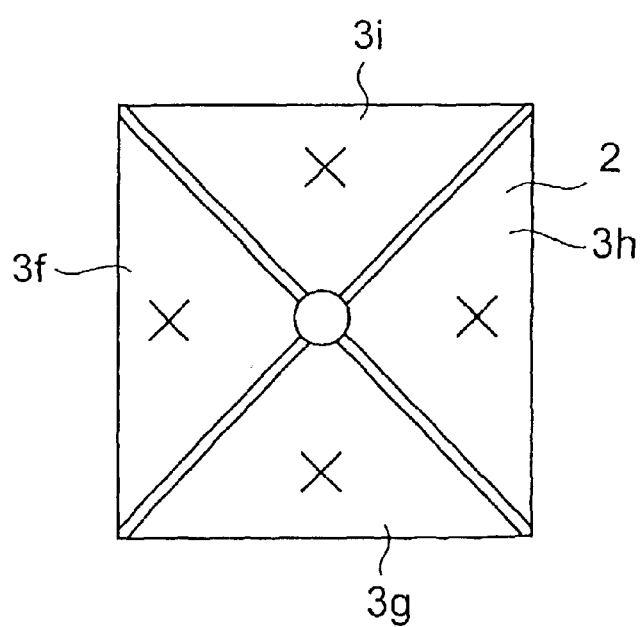
FIG. 4 is a figure showing another example of a piezoelectric element in Embodiment 1.

Next, another example of an electrode structure on the piezoelectric element 2 is shown in FIG. 4. In FIG. 4, the piezoelectric element has, on one surface, four electrode parts 3f, 3g, 3h, 3i in the areas of the vibrating body 1 separated or divided in triangular forms by two diagonal lines, and polarization-treated in the same direction as the thickness direction in the entire portion. The piezoelectric element 2 has an electrode 3a provided over the entire surface thereof. By applying a drive signal to adjacent two electrode of the four electrodes 3f, 3g, 3h, 3i, a vibration wave is caused on the vibrating body 1.

For example, by applying a driving signal to between the electrode 3a and the electrode 3f, 3g or the electrode 3a and the electrode 3h, 3i, a standing wave having a node on the diagonal line 10a of FIG. 2 is caused. Next, by applying a driving signal between the electrode 3a and the electrode 3f, 3i or the electrode 3a and the electrode 3g, 3h, a standing wave having a node on the diagonal line 10b of FIG. 2 is caused.

Next, another example is shown concerning the position of the protrusions 1a.

Figure 5:
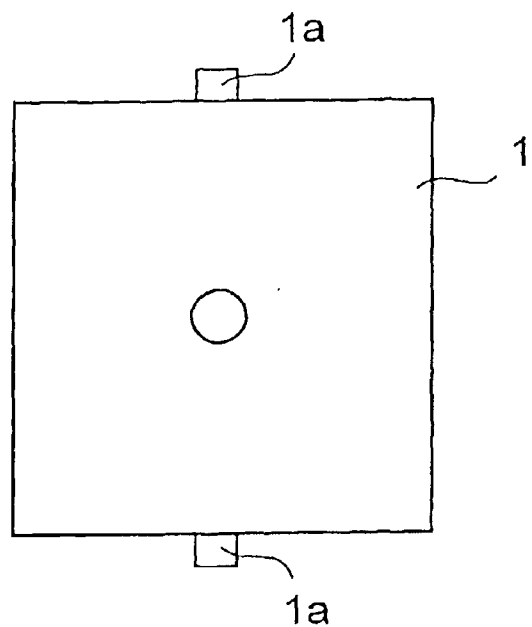
FIG. 5 is a figure showing a second example of protrusion position according to Embodiment 1.

FIG. 5 is an example that protrusions 1a are extended toward the outside of the vibrating body 1. Provided that the moving body 8 is made contact solely with the protrusions 1a of the vibrating body 1, the protrusions 1a may be made flush with the vibrating body 1. With this structure, the vibrating body 1 can be manufactured at one time by a process, such as of etching, reducing the thickness of the ultrasonic motor 100.

Figure 6:
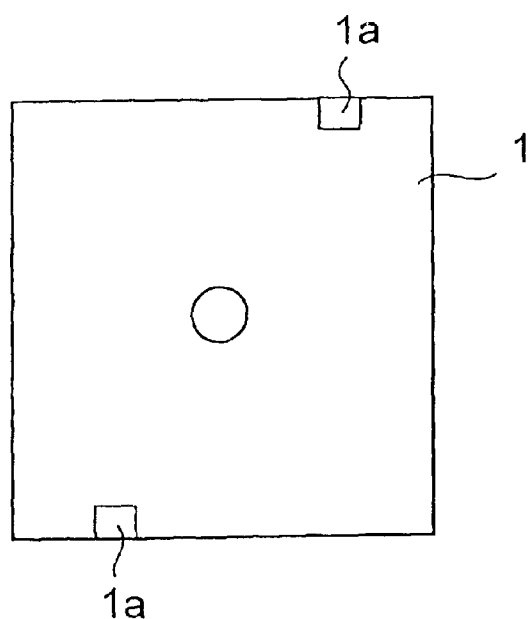
FIG. 6 is a figure showing a third example of protrusion position according to Embodiment 1.

FIG. 6 is an example that the protrusions 1a are in deviated positions. The protrusions are provided two in number, wherein provided equal are a distance of from a first protrusion to a first corner and a distance from a second protrusion to a second corner diagonally positioned to the first corner. By thus arranging the protrusions 1a on a smaller amplitude side, vibration amplitude is not suppressed even by the application pressure from the pressure-applying body 6. The increased distance from the center can increase generation torque.

Figure 7:
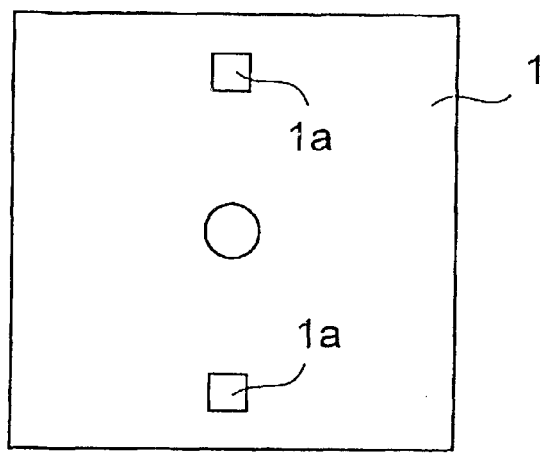
FIG. 7 is a figure showing a fourth example of protrusion position according to Embodiment 1.

FIG. 7 is an example that the protrusions 1a are shifted to a side of smaller vibration amplitude. Also in this case, it is possible to suppress the vibration amplitude from decreasing due to application pressure.

Although the vibration mode having one node was used herein, a vibration mode having a plurality of nodes parallel with this node may be utilized. Also, a vibration mode having a node circle may be utilized.

<Embodiment 2>

Next, explanation is made on another embodiment of the present invention.

Because the ultrasonic motor is not different in basic structure from FIG. 1, explanation is made on the position of protrusions 1a and drive method of the piezoelectric element 2.

Figure 8:
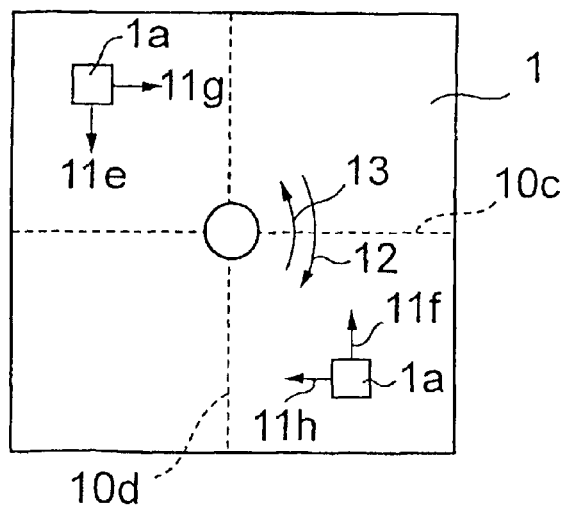
FIG. 8 is a figure showing a principle of the ultrasonic motor in Embodiment 2.

FIG. 8 is a top view of the ultrasonic motor 100 of FIG. 1 removed of the moving body 8.

In FIG. 8, the vibrating body 1 oscillates a vibration wave having a node 10c, by the piezoelectric element 2, on a line connecting between a center of a first side of the vibrating body 1 and a center of a second side opposed to the first side.

The protrusions 1a are provided in positions off the node, e.g. on a diagonal line of the vibrating body. At this time, the protrusion 1a rising in a center-shaft direction displaces also in a direction of the arrow 11e, 11f (in a direction perpendicular to a diagonal line 10c). Accordingly, the moving body 3 rotates in a direction of the arrow 13. On the other hand, if a standing wave having a node of 10d is oscillated, the tip of the protrusion 1a displaces in a direction of the arrow 11g, 11h (in a perpendicular direction to a diagonal line 10d). Accordingly, the moving body 3 rotates in a direction of the arrow 12 reverse to the arrow 13.

By thus having two protrusions 1a and providing them on the diagonal line, the ultrasonic motor 100 becomes constant in output characteristic regardless of rotational direction of the moving body 8. The protrusions 1a may be provided anywhere provided that they are in positions off the node, and the protrusion 1a may be one in number.

The electrode structure of the piezoelectric element 2 used in this embodiment may be in the form shown in FIG. 3. In such a case, if a drive signal is applied between the electrode 3a and the electrode 3b, 3d or 3c, 3e, a standing wave having a node on the diagonal line 10c is caused. Next, if a drive signal is applied between the electrode 3a and the electrode 3b, 3c or 3d, 3e, a standing wave having a node on the diagonal line 10d is caused.

The electrode structure of the piezoelectric element 2 may use the one shown in FIG. 4. In such a case, a vibration wave is oscillated on the vibrating body 1 by applying a drive signal between adjacent two electrodes of the four electrodes 3f, 3g, 3h, 3i in the figure.

For example, by applying a drive signal between the electrode 3a and the electrode 3f, 3h, a standing wave having a node on the diagonal line 10c is caused. Next, by applying a drive signal between the electrode 3a and the electrode 3g, 3i, a standing wave having a node on the diagonal line 10d is caused.

Although a vibration mode having one node was used herein, a vibration mode having a plurality of nodes parallel with this node may be utilized. Also, a vibration mode having a node circle may be utilized.

Figure 9:
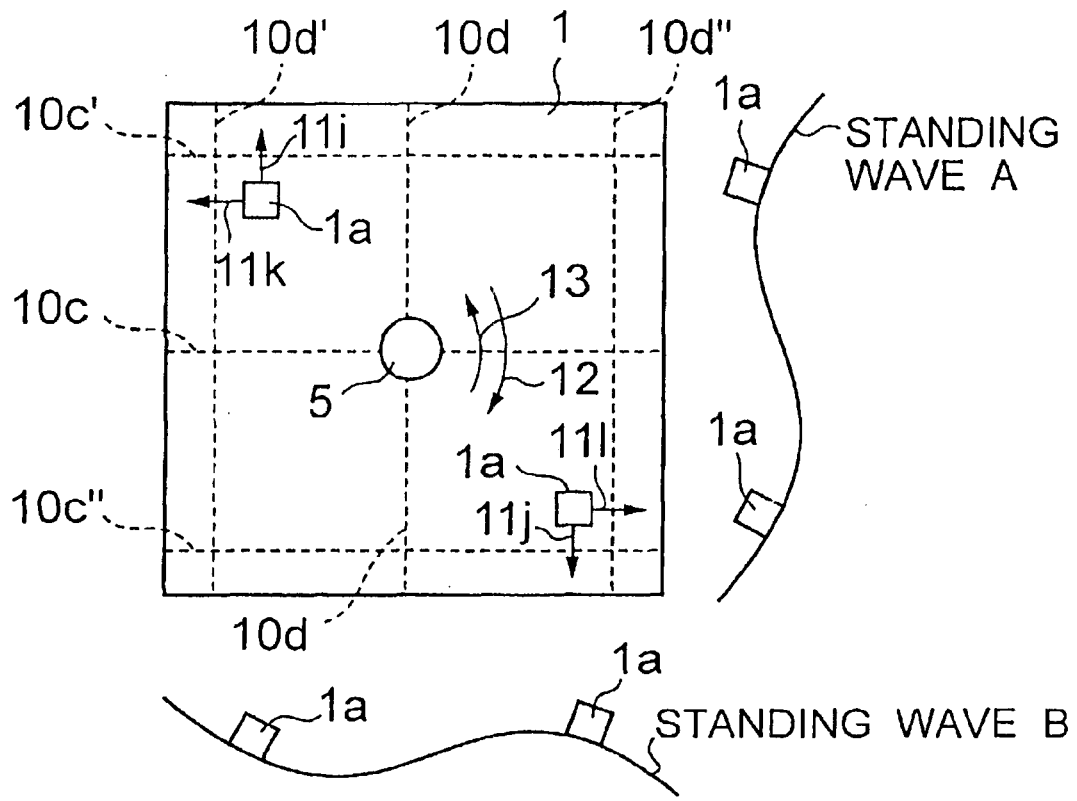
FIG. 9 is a figure showing another principle of an ultrasonic motor in Embodiment 2.

For example, as shown in FIG. 9, a standing wave A is oscillated having nodes 10c' and 10c" parallel with the node 10c, besides the node 10c (although the nodes are shown by a straight line, it in actual may have a curve line). In this manner, the higher-order vibration mode having a plurality of nodes is high in electric-mechanic coupling coefficient and can obtain high output at low voltage. At this time, the protrusion 1a positioned off the node and belly of vibration displaces in also the direction of the arrow 11i, 11j during rising. Accordingly, the moving body 8 rotates in a direction of the arrow 12. On the other hand, if a standing wave having nodes 10d, 10d', 10d" is oscillated, the tip of the protrusion 1a displaces in a direction of the arrow 11k, 11l so that the moving body 8 rotates in a direction of the arrow 13 reverse to the arrow 12.

Figure 10:
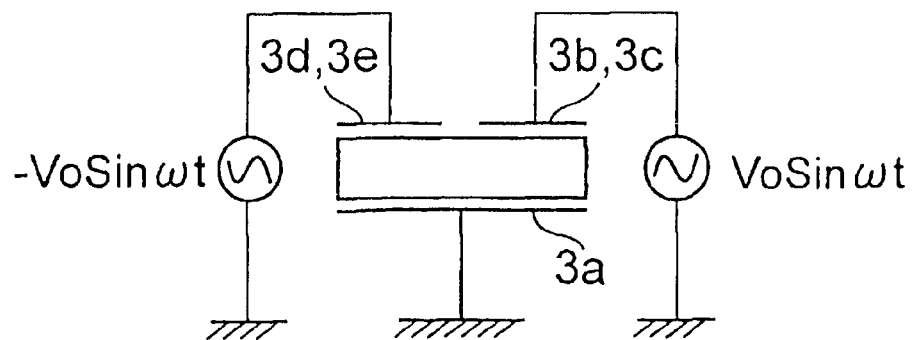
FIG. 10 is a figure showing a way of applying a drive signal of the ultrasonic motor in Embodiment 2.

The electrode structure of the piezoelectric element 2 used for driving may be the one shown in FIG. 3. In such a case, if a driving signal is applied between the electrode 3a and the electrode 3b, 3c or the electrode 3a and the electrode 3d, 3e, a standing wave is oscillated having nodes 10c, 10c', 10c". Next, if a driving signal is applied between the electrode 3a and the electrode 3c, 3e or the electrode 3a and the electrode 3b, 3d, a standing wave is oscillated having nodes 10d, 10d', 10d". Also, for example as shown in FIG. 10, if a drive signal different in phase by 180 degrees is applied between the electrode 3a and the electrode 3b, 3c and the electrode 3a and the electrode 3d, 3e, a standing wave is caused having nodes 10c, 10c', 10c". If a drive signal different in phase by 180 degrees is applied between the electrode 3a and the electrode 3b, 3d and the electrode 3a and the electrode 3c, 3e, a standing wave is caused having nodes 10d, 10d', 10d".

In this manner, by using the piezoelectric element 2 according to the invention, it is possible to obtain a greater output.

Although the vibrating body 1 herein used a square form, it may be in a rectangular form or a form having a curve surface.

That is, the form of the vibrating body 1 is arbitrary provided that oscillation can be made in a mode as shown in the above and an ultrasonic motor 100 can be structured.

<Embodiment 3>

Next, another embodiment of the invention is explained. Because the ultrasonic motor is not different in basic structure from FIG. 1, explanation is made on the position of protrusions 1a and the drive method of the piezoelectric element 2.

Figure 11:
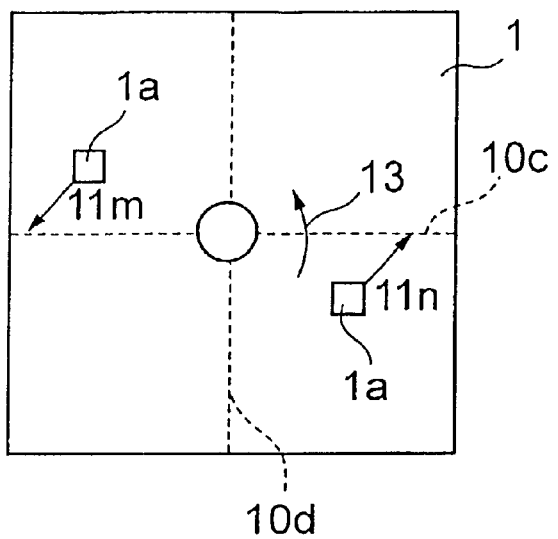
FIG. 11 is a figure showing a principle of an ultrasonic motor in Embodiment 3.

FIG. 11 is a top view of the ultrasonic motor 100 of FIG. 1 removed of the moving body 3.

In FIG. 11, the vibrating body oscillates, by the piezoelectric element 2, a vibration wave having nodes 10c and 10d on a line connecting between a center of a first side of the vibrating body 1 and a center of a second side opposed to the first side and a line connecting between a center of a third side and a center of a fourth side opposed to the third side. The protrusions 1a are provided in positions off the node and belly. In the case that the protrusions 1a are provided as in FIG. 11, the tip of the protrusion 1a rises in a center shaft direction and displaces also in a direction of the arrow 11m, 11n. Accordingly, the moving body 8 rotates in a direction of the arrow 13. The protrusions 1a on principle may be anywhere provided that they are off the node and diagonal line. Also, the protrusions 1a may be one in number or four in each node.

The electrode structure of the piezoelectric element 2, for example, may use the same as FIG. 3. In such a case, a drive signal may be applied to the electrode in the diagonal, i.e. between the electrode 3a and the electrode 3b, 3e or between the electrode 3a and the electrode 3c, 3d. Also, drive signals different in phase by 180 degrees may be applied between the electrode 3a and the electrode 3b, 3d and between the electrodes 3a and 3c, 3e. In such a case, a vibration wave having nodes 10c and 10d is oscillated on a line connecting between a center of a first side of the vibrating body 1 and a center of a second side opposed to the first side and a line connecting between a center of a third side and a center of a fourth side opposed to the third side. Also, if the points in a diagonal, e.g. the electrodes 3b and 3e and the electrodes 3c and 3d are provided as respective sets and the two sets are given reverse in polarizing direction, the phases of the drive signals applied to the electrodes may be same.

Figure 12:
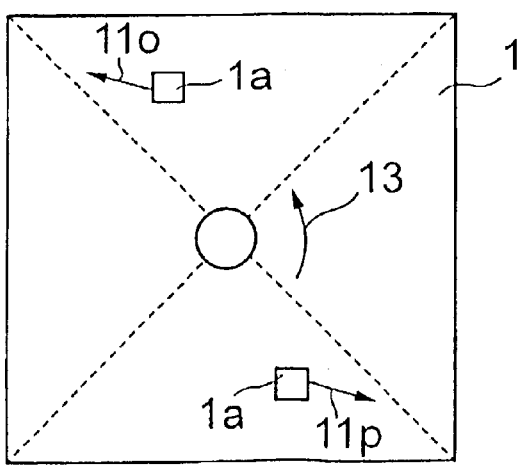
FIG. 12 is a figure showing another principle of the ultrasonic motor in Embodiment 3.

Using the piezoelectric element 2 and electrodes 3a, 3f, 3g, 3h, 3i of FIG. 4, drive signals different in phase by 180 degrees are applied between the electrodes 3a and 3I, 3g and between the electrode 3a and the electrode 3f, 3a, thereby causing a vibration wave having a node on the two diagonal lines, as shown in FIG. 12. At this time, because the protrusions 1a in FIG. 12 are provided in positions off the node on the two diagonal lines of the vibrating body 1, the tips of the protrusions 1a rise in a center shaft direction and displaces also in a direction of the arrow 11o, 11p. Accordingly, the moving body 8 rotates in a direction of the arrow 13.

In this manner, according to the invention, because a vibration wave can be oscillated by the use of the piezoelectric element entirety, the ultrasonic motor 100 is increased in output.

Of course, a drive signal may be applied only to two opposed electrodes 3i, 3g or 3f, 3h. Also, a vibration mode having a node circle as a higher mode than the above vibration mode may be utilized.

<Embodiment 4>

Next, an example concerning a supporting method of the vibrating body 1 is shown.

FIG. 13 is an example of supporting two corners 1b on one diagonal line of the vibrating body 1 shown in Embodiment 2. In FIG. 13, the vibrating body 1 is divided with an oscillating portion having protrusions 1a and a fixed portion 1c (hatched portion in FIG. 13) that are joined through two corners 1b on the diagonal line. With this structure, forming is possible at one time by etching including the support portion 1b and fixed portion 1c of the vibrating body 1. Also, because one diagonal line is restricted, it is possible to prevent other unwanted vibration modes from occurring. In supporting the vibrating body 1 of Embodiment 3, it is satisfactory to similarly support a vicinity of nodes.

FIG. 14 is an example that one diagonal line of the vibrating body is fixed by a fixing body 14. FIG. 14A is a top view and FIG. 14B is a side view. The vibrating body 1 is fixed to the support plate 4 through the fixing body 14. Bonding may be made by adhesive, solder or the like between the vibrating body 1 and the fixing body 14 or between the fixing body 14 and the support plate 4. Otherwise, the both may be integrally fabricated. This prevents other unwanted vibration modes from occurring and provides a strong structure against application pressure from the pressure-applying body 6, thus enabling generation of high torque. In supporting the vibrating body 1 of Embodiment 3, it is satisfactory to similarly support it on a line having nodes.

<Embodiment 5>

Figure 15A:
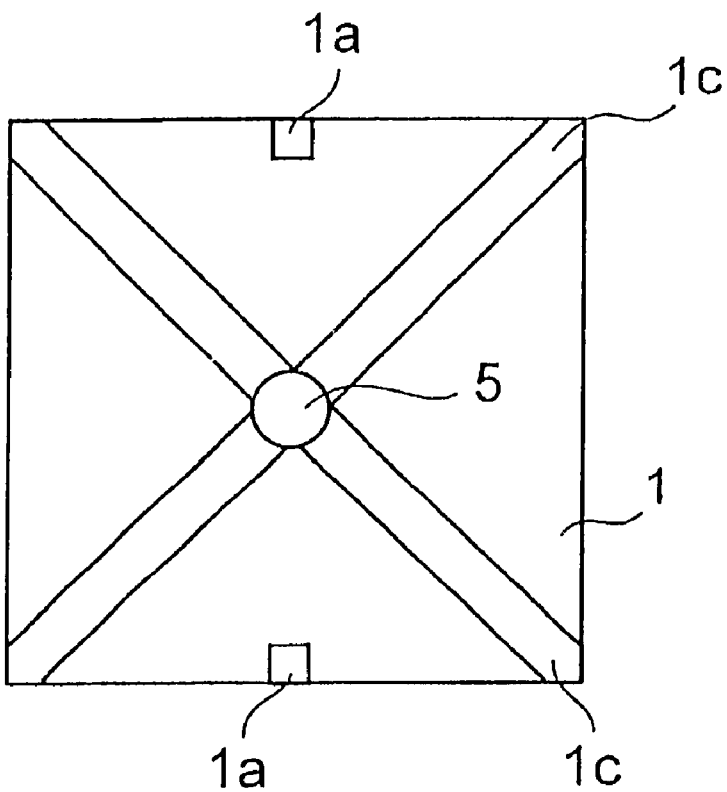
FIG. 15 is a figure showing another example of a vibrating body form of the ultrasonic motor of the invention.
Figure 15B:
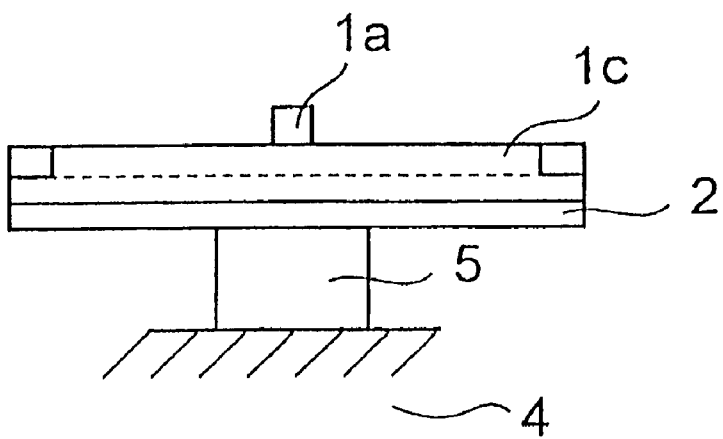

FIG. 15 is an example that in the vibrating body of Embodiment 1 a groove is provided on the diagonal lines of the vibrating body 1, i.e. in a position of vibration node, wherein FIG. 15A is a top view and FIG. 15B is a side view. With this structure, it is possible to reduce rigidity at the node as a fulcrum of vibration and increase vibration amplitude as well as to decrease resonant frequency. Also, unwanted vibration modes can be prevented from occurring.

In the case of the vibrating body 1 of Embodiment 3, a groove 1c may be provided on a line having nodes. Also, regardless of the groove, a similar effect can be obtained if means for reducing rigidity is provided by means of a hole or the like in part on the node.

<Embodiment 6>

In the case where the piezoelectric element 2 is polarization-treated after bonded to the vibrating body 1, it is extremely effective to polarize in the same direction a polarization area comprising a plurality of electrodes as was shown in Embodiment 1, 2 and 3.

On this occasion, it is especially effective to form a thin, thick film comprising a piezoelectric element 2 by using a process of a sputter method, a sol-gel method, a printing method, an ion beam method, a molecular beam epitaxy method, a laser ablation method, a gas deposition method, an electrophretic method, an (MO)CVD method or the like, without using an adhesive. Although strain is caused during polarization, if polarization treatment is made in different directions in a same plane, strain differs in direction causing complicate deformation in the vibrating body 1 bonded with the piezoelectric element 2. Due to this, the contact between the vibrating body 1 and the piezoelectric body 2 becomes uneven thus causing lowering in motor characteristics. Also, large strain is caused in the boundary where polarization direction changes resulting a fear of causing a problem of stripping in a joint portion between the piezoelectric element 2 and the vibrating body 1. Contrary to this, the above problem can be suppressed by making all the polarization directions as a same direction and making even the strain. A similar effect is obtained where polarization is made after joining the piezoelectric element 2 using an adhesive. However, because the adhesive absorbs somewhat the strain upon polarization, the effect is greater where direct joining is made without using an adhesive.

For example, by making same all the polarization directions as was shown in Embodiment 2 or 3 and applying two signals whose application voltage signals are changed in phase by 180 degrees, it is possible to generate vibration similar to the case the polarization direction is changed.

In the meanwhile, where a process of a sputter, sol-gel method or the like is used in this manner, the electrode 3a is not necessarily needed. If the vibrating body 1 is a conductor, the vibrating body 1 can serves also as an electrode of the piezoelectric element 2.

Also, the electrode 3 form, the vibrating body 1 form and the like are not limited to those shown in the invention but may be anything provided that the piezoelectric driver has a piezoelectric element 2 having a plurality of electrodes. Accordingly, an actuator, sensor, transformer, filter having a piezoelectric element 2 and the like are included in a category of the present embodiment.

<Embodiment 7>

Figure 16:
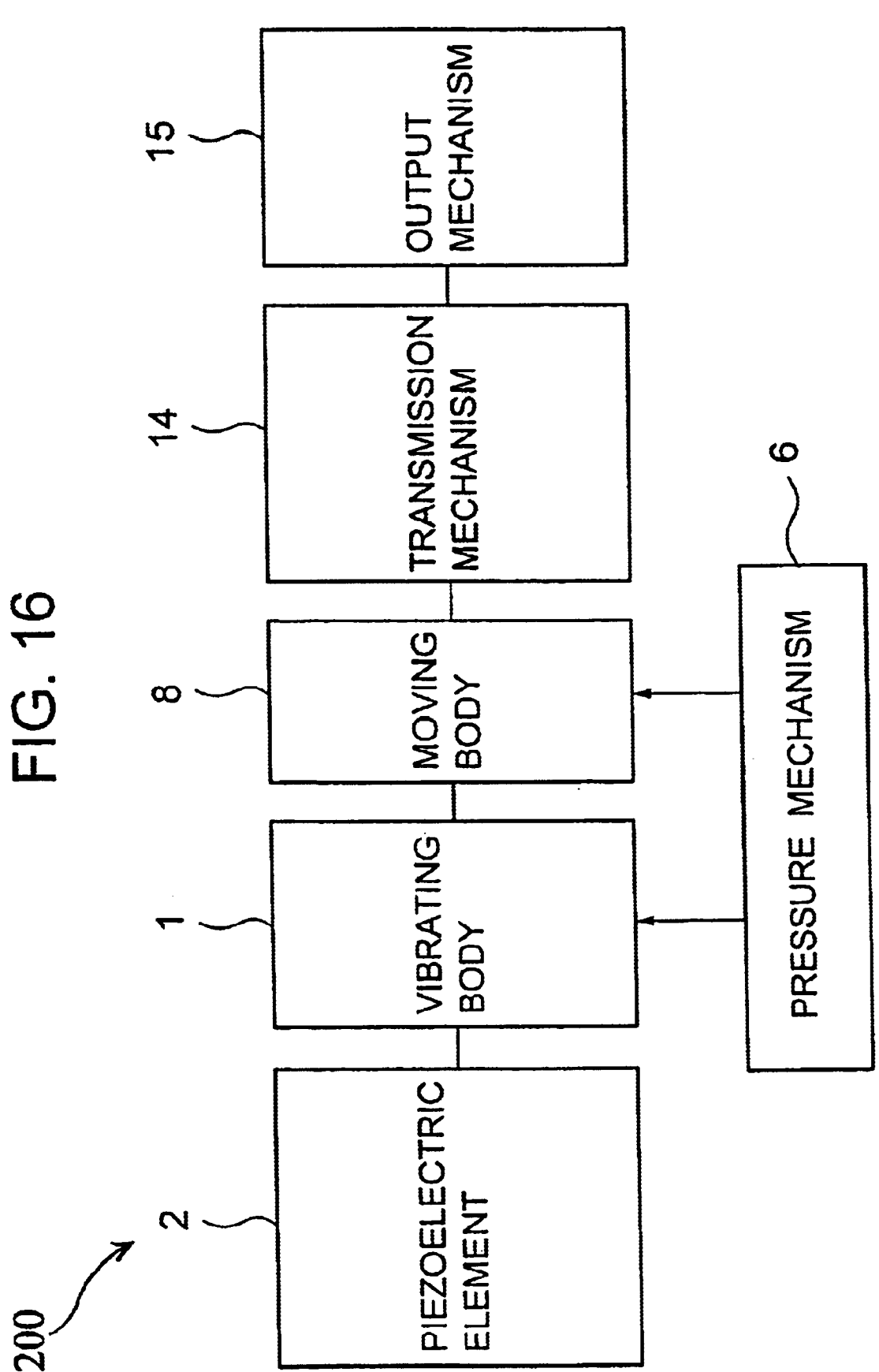
FIG. 16 is an explanatory figure showing a block diagram of an electronic apparatus using the ultrasonic motor of the invention.

FIG. 16 shows a block diagram of Embodiment 7 that the invention is applied to an electronic apparatus having an ultrasonic motor.

An electronic apparatus 200 having an ultrasonic motor is realized by comprising a vibrating body 1 bonded with a piezoelectric element 2 processed by a predetermined polarization treatment, a moving body 8 to be driven by the vibrating body 1, a pressure-applying body 6 to pressure-contact between the vibrating body 1 and the moving body 8 to be driven by the vibrating body 1, a transmission mechanism 14 to operate by interaction with the moving body 8, and an output mechanism 15 to move based on operation of the transmission mechanism 14.

Herein, the transmission mechanism 14 uses, for example, a transmission wheel such as a gear or a friction wheel. The output mechanism 15 uses, for example, in a camera a shutter drive mechanism and lens drive mechanism, in an electronic timepiece a hand drive mechanism and calendar drive mechanism, and in an optical device a filter drive mechanism and mirror drive mechanism, and the like.

The electronic apparatus 200 having an ultrasonic motor is to be applied for, for example, electronic timepiece, measuring instruments, cameras, printers, printing machines, machine tools, robots, transfer machines, medical equipment, optical devices, information apparatuses and the like.

Incidentally, if an output shaft is attached to the moving body 8 to provide a structure having a power transmission mechanism to deliver torque from the output shaft, a drive mechanism can be realized by a single ultrasonic motor.

As explained above, according to the ultrasonic motor of the present invention, it is possible to obtain a vibration component required for driving the moving body regardless of the plate thickness of the vibrating body and reducing the thickness of the vibrating body and further the ultrasonic motor overall. Also, because the resonant frequency of the vibrating body can be decreased, a great amplitude can be obtained even if made smaller, thus realizing an efficient ultrasonic motor. Also, restriction of a driving circuit due to allowable frequency and the like can be reduced, and consumption power can be decreased.

Also, driving is electrically possible on a single-phase signal. Further, where switching a rotation direction, by providing a plurality of electrode on the piezoelectric element on the vibrating body and selecting an electrode to which a drive signal is applied, the position of a node of vibration oscillated on the vibrating body can be moved to vary the rotation direction of the moving body, hence easily realizing drive by a self-oscillating circuit.

Furthermore, because the vibrating body is quadrilateral in shape, a multiplicity of vibrating bodies can be formed at one time by dicing or the like. Even if blanking is made using a press or the like, material can be effectively utilized without leaving the remainder.

Also, in the piezoelectric driving body including an ultrasonic motor of the invention, the polarizing directions of the piezoelectric element having a plurality of electrode portions are all made in the same direction. Due to this, for example, it is possible to suppress or make even deformation caused where polarization is made after the piezoelectric element is bonded to the vibrating body. The contact situation with the moving body contacting the vibrating body becomes favorable, making it possible to prevent lowering of efficiency and decrease the variation between individual products. By polarizing the entire piezoelectric element in the same direction at one time, polarization is favorably provided thus making it possible to obtain a large drive force at lower voltage from the piezoelectric vibrating body.

Also, by providing an ultrasonic motor or piezoelectric driving body of the invention on an electronic apparatus, it is possible to realize the reduction of size, thickness and consumption power for the electronic apparatus.

What is claimed is:

1. An ultrasonic motor comprising:
   a vibrating body;
   a piezoelectric element disposed on the vibrating body for generating a vibration wave to vibrate the vibrating body, the vibration wave having a vibration node disposed on a diagonal line of the vibrating body, the piezoelectric element having four areas divided by two lines each connecting centers of a first pair of opposite sides and centers of a second pair of opposite sides, respectively, of the vibrating body, each of the four areas having an electrode portion;
   at least one protrusion connected to the vibrating body for vibration therewith, the protrusion being disposed on the vibrating body at a position which does not correspond to the position of the vibration node; and
   a moving body disposed in contact with and driven by the protrusion during vibration thereof.

2. An ultrasonic motor comprising:
   a vibrating body;
   a piezoelectric element having four areas each having an electrode portion and divided by two diagonal lines of the vibrating body, the piezoelectric element being disposed on the vibrating body for generating a vibration wave to vibrate the vibrating body, the vibration wave having a vibration node disposed on a line connecting a center of a first side of the vibrating body and a center of a second side of the vibrating body opposite to the first side;
   at least one protrusion connected to the vibrating body for vibration therewith, the protrusion being disposed on the vibrating body at a position which does not correspond to the position of the vibration node; and
   a moving body disposed in contact with and driven by the protrusion during vibration thereof.

3. An ultrasonic motor according to claim 1; wherein the at least one protrusion comprises two protrusions disposed symmetrically about a center of the vibrating body.

4. An ultrasonic motor according to claim 1; further comprising a support member f or supporting the vibrating body at a center thereof.

5. An ultrasonic motor comprising:
   a vibrating body;
   a piezoelectric element disposed on the vibrating body for generating a vibration wave to vibrate the vibrating body, the vibration wave having a vibration node disposed on a diagonal line of the vibrating body;
   at least one protrusion connected to the vibrating body for vibration therewith, the protrusion being disposed on the vibrating body at a position which does not correspond to the position of the vibration node;
   a moving body disposed in contact with and driven by the protrusion during vibration thereof; and
   a support member for supporting the vibrating body along the diagonal line thereof.

6. An ultrasonic motor comprising:
   a vibrating body;
   a piezoelectric element disposed on the vibrating body for generating a vibration wave to vibrate the vibrating body, the vibration wave having a vibration node disposed on a diagonal line of the vibrating body;
   at least one protrusion connected to the vibrating body for vibration therewith, the protrusion being disposed on the vibrating body at a position which does not correspond to the position of the vibration node;
   a moving body disposed in contact with and driven by the protrusion during vibration thereof; and
   a support member for supporting at least two corners of the vibrating body along the diagonal line thereof.

7. An ultrasonic motor comprising:
   a vibrating body;
   a piezoelectric element disposed on the vibrating body for generating a vibration wave to vibrate the vibrating body, the vibration wave having a vibration node disposed on a diagonal line of the vibrating body;
   at least one protrusion connected to the vibrating body for vibration therewith, the protrusion being disposed on the vibrating body at a position which does not correspond to the position of the vibration node;
   a moving body disposed in contact with and driven by the protrusion during vibration thereof; and
   a support member for supporting the vibrating body along a line connecting a center of a first side of the vibrating body and a center of a second side of the vibrating body opposite the first side.

8. An ultrasonic motor comprising: a vibrating body; a piezoelectric element disposed on the vibrating body for generating a vibration wave to vibrate the vibrating body, the vibration wave having a vibration node disposed on a diagonal line of the vibrating body; at least one protrusion connected to the vibrating body for vibration therewith, the protrusion being disposed on the vibrating body at a position which does not correspond to the position of the vibration node; and a moving body disposed in contact with and driven by the protrusion during vibration thereof; wherein the vibrating body has a groove formed in a surface thereof and along the diagonal line.

9. An ultrasonic motor according to claim 1; wherein the vibrating body is driven by applying a drive signal to two of the electrode portions of the piezoelectric element.

10. An ultrasonic motor comprising: a generally plate-shaped vibrating body; and a piezoelectric element bonded on the vibrating body and having four areas divided by two diagonal lines of the vibrating body and a plurality of polarized portions polarized in the same direction, each area having an electrode portion corresponding to a respective one of the polarized portions; wherein the vibrating body is vibrated by applying drive signals different in phase by 180 degrees to two of the electrode portions.

11. An electronic apparatus comprising: an ultrasonic motor according to claim 1; a transmission mechanism for transmitting movement of the moving body; and an output mechanism for producing an output motion in accordance with the movement transmitted by the transmission mechanism.

12. An ultrasonic motor according to claim 1; wherein the vibrating body has a quadrilateral shape.

13. An ultrasonic motor according to claim 12; wherein the piezoelectric element has a plurality of electrodes for generating a bending vibration wave in a thickness direction of the vibrating body.

14. An ultrasonic motor according to claim 13; wherein the piezoelectric element has a plurality of polarized portions polarized in the same direction and each corresponding to a respective one of the electrodes.

15. An ultrasonic motor according to claim 13, wherein the plurality of electrodes comprises a plurality of adjacent pairs of electrodes; and wherein the vibrating body is vibrated by applying a driving signal to the pairs of electrodes.

16. An ultrasonic motor according to claim 13; wherein the plurality of electrodes comprises a plurality of pairs of electrodes; and wherein the vibrating body is vibrated by applying a driving signal to the pairs of electrodes.

17. An ultrasonic motor according to claim 1; wherein the piezoelectric element has a plurality of electrodes for generating a bending vibration wave in a thickness direction of the vibrating body.

18. An ultrasonic motor according to claim 2; wherein the vibrating body has a quadrilateral shape.

19. An ultrasonic motor according to claim 2; wherein the piezoelectric element has a plurality of electrodes for generating a bending vibration wave in a thickness direction of the vibrating body.

20. An ultrasonic motor according to claim 2; wherein the vibrating body is vibrated by applying a driving signal to two of the electrodes.

21. An ultrasonic motor according to claim 2; wherein the piezoelectric element has a plurality of electrodes for generating a bending vibration wave of a thickness direction of the vibrating body and a plurality of polarized portions polarized in the same direction and each corresponding; to a respective one of the electrodes.

22. An ultrasonic motor according to claim 2; wherein the plurality of electrodes comprises a plurality of adjacent pairs of electrodes; and wherein the vibrating body is vibrated by applying a driving signal to the pairs of electrodes.

23. An ultrasonic motor according to claim 2; wherein the plurality of electrodes comprises a plurality of pairs of electrodes; and wherein the vibrating body is vibrated by applying a driving signal to the pairs of electrodes.

24. An ultrasonic motor according to claim 2; wherein the piezoelectric element has a plurality of electrodes for generating a bending vibration wave in a thickness direction of the vibrating body.

25. An ultrasonic motor according to claim 2; wherein the at least one protrusion comprises a plurality of protrusions disposed symmetrically about a center of the vibrating body.

26. An ultrasonic motor according to claim 2; further comprising a support member for supporting a center of the vibrating body.

27. An ultrasonic motor comprising:
a vibrating body;
a piezoelectric element disposed on the vibrating body for generating a vibration wave to vibrate the vibrating body, the vibration wave having a vibration node disposed on a line connecting a center of a first side of the vibrating body and a center of a second side of the vibrating body opposite to the first side;
at least one protrusion connected to the vibrating body for vibration therewith, the protrusion being disposed on the vibrating body at a position which does not correspond to the position of the vibration node;
a moving body disposed in contact with and driven by the protrusion during vibration thereof; and
a support member for supporting the vibrating body along a diagonal line of the vibrating body.

28. An ultrasonic motor comprising:
a vibrating body;
a piezoelectric element disposed on the vibrating body for generating a vibration wave to vibrate the vibrating body, the vibration wave having a vibration node disposed on a line connecting a center of a first side of the vibrating body and a center of a second side of the vibrating body opposite to the first side;
at least one protrusion connected to the vibrating body for vibration therewith, the protrusion being disposed on the vibrating body at a position which does not correspond to the position of the vibration node;
a moving body disposed in contact with and driven by the protrusion during vibration thereof; and
a support member for supporting a corner of the vibrating body along a line extending from a diagonal line of the vibrating body.

29. An ultrasonic motor comprising:
a vibrating body;
a piezoelectric element disposed on the vibrating body for generating a vibration wave to vibrate the vibrating body, the vibration wave having a vibration node disposed on a line connecting a center of a first side of the vibrating body and a center of a second side of the vibrating body opposite to the first side;
at least one protrusion connected to the vibrating body for vibration therewith, the protrusion being disposed on the vibrating body at a position which does not correspond to the position of the vibration node; and
a moving body disposed in contact with and driven by the protrusion during vibration thereof;
wherein the vibrating body has a groove formed in a surface thereof and along a line on which the vibration node extends.

30. An electronic apparatus comprising: an ultrasonic motor according to claim 2; a transmission mechanism for transmitting movement of the moving body; and an output mechanism for producing an output motion in accordance with the movement transmitted by the transmission mechanism.

31. An ultrasonic motor according to claim 1; wherein the piezoelectric element has a plurality of electrodes for generating a bending vibration wave in a thickness direction of the vibrating body and a plurality of polarized portions polarized in the same direction and each corresponding to a respective one of the electrodes.

32. An ultrasonic motor comprising:

a vibrating body;

a piezoelectric element disposed on the vibrating body for generating a vibration wave to vibrate the vibrating body, the vibration wave having a vibration node disposed on a line connecting a center of a first side of the vibrating body and a center of a second side of the vibrating body opposite the first side, the piezoelectric element having four areas divided by two lines each connecting centers of a first pair of opposite sides and centers of a second pair of opposite sides, respectively, of the vibrating body, each of the four areas having an electrode portion;

at least one protrusion connected to the vibrating body for vibration therewith, the protrusion being disposed on the vibrating body at a position which does not correspond to the position of the vibration node; and a moving body disposed in contact with and driven by the protrusion during vibration thereof.

33. An ultrasonic motor comprising:

a vibrating body;

a piezoelectric element having four areas each having an electrode portion and divided by two diagonal lines of the vibrating body, the piezoelectric element being disposed on the vibrating body for generating a vibration wave to vibrate the vibrating body, the vibration wave having a vibration node disposed on a diagonal line of the vibrating body;

at least one protrusion connected to the vibrating body for vibration therewith, the protrusion being disposed on the vibrating body at a position which does not correspond to the position of the vibration node; and a moving body disposed in contact with and driven by the protrusion during vibration thereof.

* * * * *